No. 877,246.

PATENTED JAN. 21, 1908.

E. A. SPERRY.

METHOD OF EFFECTING REACTIONS BETWEEN SOLIDS AND GASES.

APPLICATION FILED MAR. 5, 1906.

2 SHEETS—SHEET 1.

Witnesses.

Inventor:
Elmer A. Sperry,
by Byrnes & Townsend
Att'ys.

No. 877,246. PATENTED JAN. 21, 1908.
E. A. SPERRY.
METHOD OF EFFECTING REACTIONS BETWEEN SOLIDS AND GASES.
APPLICATION FILED MAR. 5, 1906.

2 SHEETS—SHEET 2.

Witnesses:
Geo. E. Gauntt
J. B. Hill

Inventor:
Elmer A. Sperry
by Byrnes & Townsend,
Att'ys.

UNITED STATES PATENT OFFICE.

ELMER A. SPERRY, OF BROOKLYN, NEW YORK, ASSIGNOR TO CHEMICAL REDUCTION COMPANY, OF NEW YORK, N. Y., A CORPORATION OF NEW YORK.

METHOD OF EFFECTING REACTIONS BETWEEN SOLIDS AND GASES.

No. 877,246.

Specification of Letters Patent.

Patented Jan. 21, 1908.

Application filed March 5, 1906. Serial No. 304,417.

*To all whom it may concern:*

Be it known that I, ELMER A. SPERRY, a citizen of the United States, residing at Brooklyn, in the county of Kings and State of New York, have invented certain new and useful Improvements in Methods of Effecting Reactions Between Solids and Gases, of which the following is a specification.

This invention is a method of effecting reactions between solids and gases and consists essentially in circulating a body of liquid capable of dissolving the gas in contact with the solid and with the gas under conditions which accomplish a rapid absorption of the gas and a rapid reaction of the same with the solid. The gas absorbing surface is relatively extended and preferably the surface exposed to the gas is increased by providing and constantly renewing films of the liquid in contact therewith.

A preferred form of apparatus for carrying out my method is shown in the accompanying drawings wherein—

Figure 1:
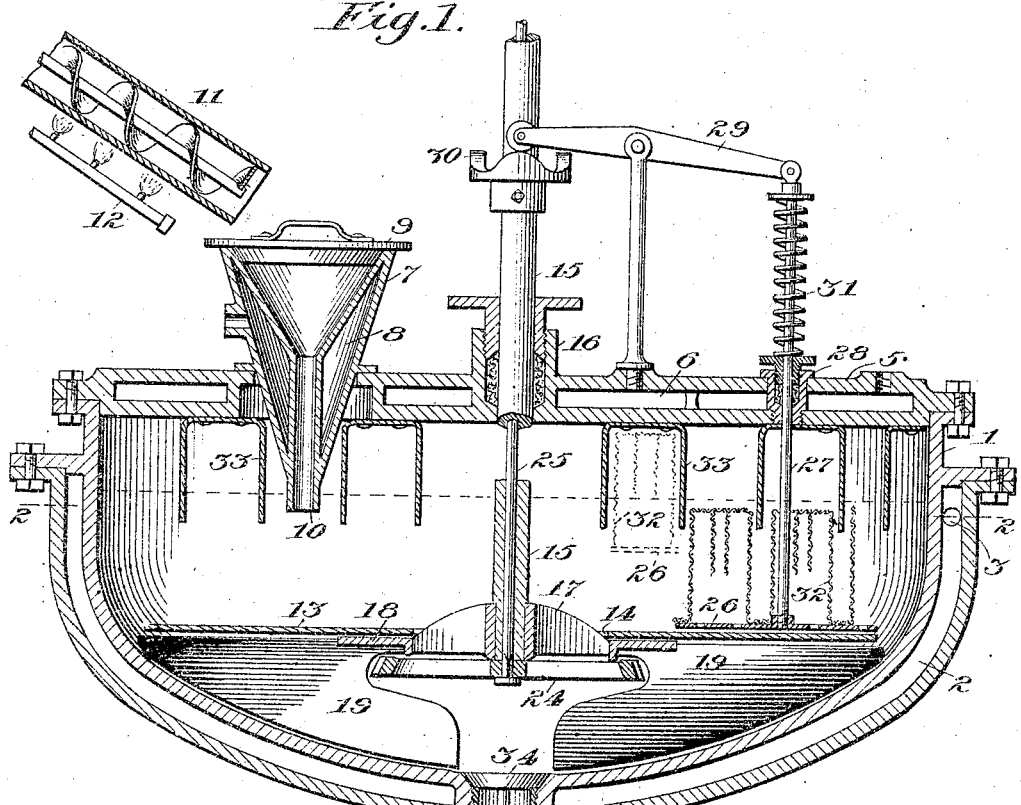
Figure 4:
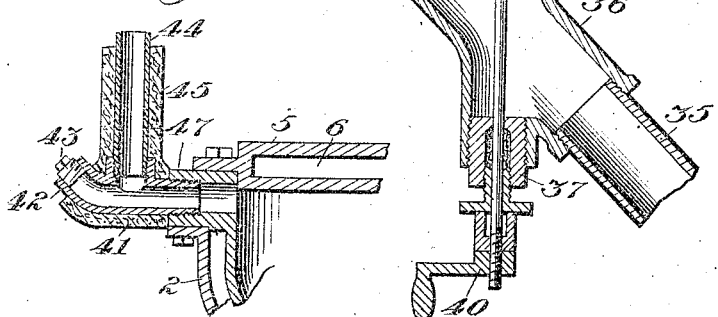
Figure 2:
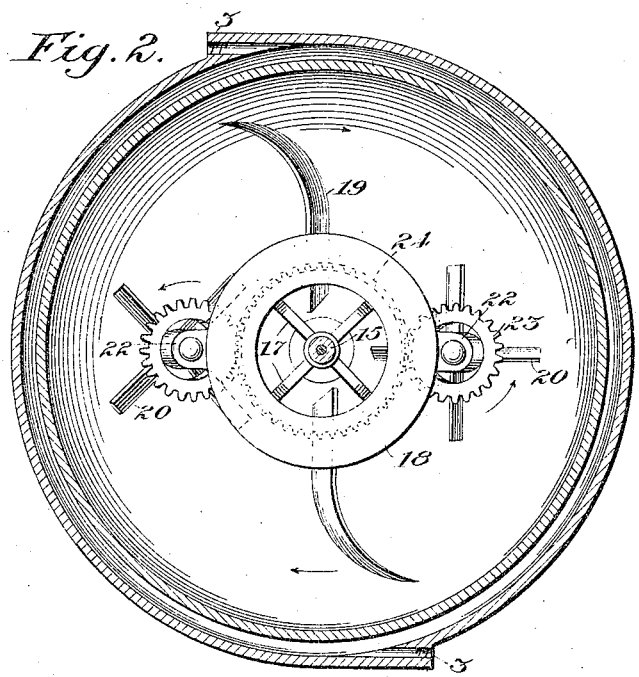
Figure 3:
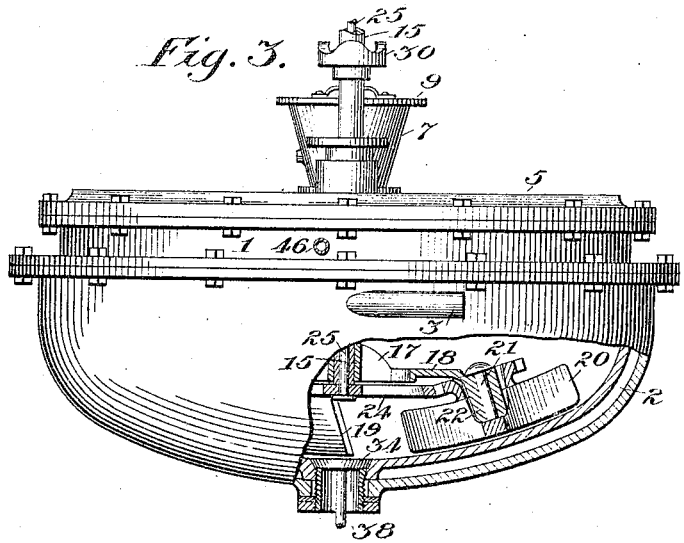

Figure 1 is a central longitudinal section of a form of reaction vessel for carrying my method into effect; Fig. 2 is a horizontal section of the same on a somewhat smaller scale on line 2—2 of Fig. 1, the septum and reciprocating devices being removed; Fig. 3 is a side elevation on the same scale as Fig. 2, parts being broken away, and the septum and disk-reciprocating devices removed; and Fig. 4 is a detail section of one of the gas connections.

1 represents a relatively shallow vessel which may be constructed of cast iron, lead, or which may be constructed of or lined with any material adapted to resist the particular reagents to be used. The body of the vessel is provided with a jacket 2 having tangential inlets 3, 3 for steam or water, and an outlet 4, this arrangement being found to insure a substantially even heating or cooling effect. The cover 5 is removable, and is provided with interior passages 6 for water. The cover supports a removable hopper 7 jacketed as shown at 8 for heating the contents thereof; the hopper is provided with a cover 9 and depends into the vessel as shown at 10 to a sufficient depth to be sealed by the liquid therein. Charging means 11 located above the hopper are preferably provided with means, indicated at 12, for heating the incoming material.

13 is a septum, suitably supported within the vessel, and illustrated as a horizontal ring-shaped disk, spaced from the walls of the vessel at its periphery and having a central aperture 14. A hollow shaft 15 extends through a stuffing-box 16 in the cover and carries at its lower end arms 17 supporting an annular disk 18 to which are secured lifting and stirring blades 19. These blades are preferably two in number and are oppositely disposed, the effect of this arrangement, together with the conformation of the blades, being to produce a wave action at the surface of the liquid, the purpose of which is to expose an extended surface of the same as hereinafter more fully explained. The blades extend approximately to the bottom of the vessel and are forwardly inclined in the direction of movement in such manner as to exert a lifting action on its liquid or solid contents; the outer ends of the blades may be curved backward as shown, the design being such as to insure an equal distribution of the materials with which they come in contact. The blades serve to impart to the liquid contents of the vessel a movement of circulation which in the particular form of device illustrated is outward beneath the disk 13 and inward above the same. The disk 13 may be carried by the shaft 15 and rotate therewith if desired.

Between the blades 19 I preferably mount agitating devices, the purpose of which is to maintain finely divided solid matter in suspension in the circulating liquid, and to agitate it violently in contact therewith. As one form of agitating device I have shown inclined blades 20 mounted near the bottom of the vessel and adapted to the curvature of the same, carried by a shaft 21 supported in a bearing in a lug 22 on the disk 18. A gear 23 secured to the blades 20 meshes with a stationary gear 24 carried by a fixed shaft 25 disposed within the rotating shaft 15. As the agitating devices, of which two are shown, revolve with the disk 18 they rotate in their bearings 22 in the direction indicated by the arrows and thoroughly agitate the liquid and commingle the solids therewith. The effect of this arrangement is to maintain solids even when of relatively high specific gravity in suspension in the liquid.

Above the septum 13 I prefer to mount a perforated disk 26 and to provide means for reciprocating the same in a vertical direction, the means shown comprising a plurality of rods 27, of which one only is shown, secured to the disk 26 and extending through stuffing boxes 28 in the cover; downward movement is imparted to the disk by a lever 29 actuated by a cam 30 on the shaft 15; a spring 31 serves to return the disk to its upper position. The disk 26 serves to maintain the solids in suspension in the portion of the liquid above the septum 13, and further serves to support a plurality of strips or pieces of wire-gauze or equivalent fabric or pervious structure 32, the function of which is to lift the liquid above its normal level and to expose extended surfaces of the same to the action of the gas in the upper portion of the vessel. The character and material of the liquid-exposing devices 32 will depend upon the materials treated; they should be substantially unattacked by the gas or the solvent liquid, and should possess such structure as to be capable of retaining by capillarity a film of the liquid, thereby exposing both surfaces thereof for absorption of the gas. Perforated sheets or fabrics, whether metallic or otherwise, may be available for this purpose.

In order to improve the intimacy of contact between gas and liquid I prefer to direct the former in a restricted path above the latter, and for this purpose I provide baffles or depending partitions 33 extending transversely across the vessel and adapted to be sealed by the liquid therein. The arrangement of the baffles is such as to direct the gas in a tortuous path between the inlet and outlet 46, 47. In addition to their function in directing the gas the partitions 33 coöperate with the circulating blades 19, in that they are in position to be wetted by the waves produced by these blades, thus exposing a constantly renewed liquid surface to the gas.

34 represents a discharge valve closing the upper end of the discharge conduit 35; the latter is illustrated as of special construction, comprising an angular cross 36 of which the lower aperture carries a stuffing box 37 for the valve stem 38, while one of the lateral apertures carries a removable plug 39 for convenience in cleaning. The stem 38 may be reciprocated through the stuffing box for operating the valve, and carries at its lower end a handle 40 by means of which the valve may be rotated for the purpose of grinding it to its seat or for clearing it from matter which would interfere with its seating. This feature is of particular value in valves for the discharge of finely divided solid matters.

In Fig. 4 I have shown in detail a preferred form of gas connection, comprising a pipe 41 having an upwardly inclined outer end 42, a removable closure 43 therefor, and a branch pipe 44 for the gas. The purpose of the upward inclination of the ends is to permit inspection or cleaning of the pipe 41 without danger of loss of the liquid contents of the vessel. At 45 I have shown a heat-insulating covering which is applied to the gas outlet pipe and which serves to prevent condensation or separation therein of any volatile reaction products; by properly covering said pipe I find that I am enabled to substantially prevent clogging of the same, as, for instance, by the separation of hydrated stannic chlorid in the production of stannic chlorid as hereinafter referred to. The liquid outlet in a vessel provided with circulating and agitating means may be substantially similar in construction, except that a downwardly turned branch pipe is provided; such outlet may be located somewhat above the normal liquid level, the wave action above referred to being sufficient for the discharge of any accumulation of liquid.

In most cases it is desirable that the gas-absorbing surfaces of the liquid should be maintained at a lower temperature than the reaction zone where the absorbed gas is brought into contact with the solid matter, it being well understood that absorption or solution of the gas is more rapid at lower temperatures. In the present construction this is provided for by means of the water-cooled cover through which heat is abstracted not only from the gas chamber itself but from the partitions 33 which serve as above pointed out as supplemental surfaces for the exposure of films of liquid. By means of the jacket 2 such temperature is maintained in the region of reaction as is most favorable under the particular conditions.

As one example of my method I may produce a metal-bearing solution by reaction between a finely divided metal, matte, concentrate or ore and a gas capable of yielding therewith a soluble salt, as for instance, by the solution of a copper-nickel matte or alloy by reaction with chlorin. In such case the matte or alloy is reduced to a state of fine subdivision and is introduced in a heated condition through the charging tube 11 into the hopper 7, falling thence into the liquid and being maintained in suspension therein and circulating therewith by the combined action of the blades 19 and 20. The liquid in this case will preferably be water or an aqueous solution of hydrochloric acid. The chlorin is admitted at 46 and traverses the vessel in a tortuous and restricted path above the liquid, any unabsorbed chlorin or residual gases escaping at an oppositely disposed outlet 47 (Fig. 4). The chlorin is dissolved by the liquid and by it brought into reacting relation with the solids suspended therein, the reaction yielding the chlorids of the respective metals. To further promote the solution of chlorin I expose extended liquid surfaces thereto by means of the partitions 33, which as above described are constantly wetted by the wave action produced by the blades 19;. the exposed surfaces are if required further extended by the fabric or other previous sheets 32 which are reciprocated to constantly lift new films of the liquid into the gas chamber. Solution of the chlorin is still further promoted by the cooling of the gas and liquid by abstraction of heat through the cover 5 from the gas itself and from the depending partitions 33.

As another example of my method I may refer to the production of soluble sulfites, as for instance zinc sulfite, by reaction between a zinc-bearing material and sulfur dioxid in presence of water or a solution of sulfurous acid. A further example is the production of stannic chlorid, by reaction between chlorin and a tin-bearing material in presence of liquid stannic chlorid, as described and claimed in my copending application Serial Number 304,328, filed March 5, 1906.

I claim:—

1. The method of effecting reactions between solids and gases which consists in agitating a body of liquid capable of dissolving the gas, maintaining the solid in suspension therein, and exposing portions of said liquid to the gas, said portions exposed to the gas being at a lower temperature whereby solution of the gas is promoted.

2. The method of effecting reactions between solids and gases which consists in circulating a body of liquid capable of dissolving the gas, maintaining the solid in suspension in one portion of the circulating liquid, and exposing another portion thereof to the action of the gas, said portion exposed to the gas being at a lower temperature whereby solution of the gas is promoted.

3. The method of effecting reactions between solids and gases which consists in circulating a body of liquid capable of dissolving the gas, maintaining the solid in suspension in one portion of the circulating liquid, and exposing another portion thereof to the action of the gas, said portion containing the solid in suspension being maintained at a suitable temperature whereby the reaction between the gas and the solid is accelerated.

4. The method of effecting reactions between solids and gases which consists in agitating a liquid capable of dissolving the gas, introducing the solid in a heated condition into said liquid, and exposing portions of said liquid to the gas.

In testimony whereof, I affix my signature in presence of two witnesses.

ELMER A. SPERRY.

Witnesses:
C. W. FOWLER,
C. P. TOWNSEND.